Patented Aug. 27, 1929.

1,725,794

UNITED STATES PATENT OFFICE.

MORTIMER T. HARVEY, OF NEW YORK, N. Y., ASSIGNOR, BY DIRECT AND MESNE ASSIGNMENTS, TO THE HARVEL CORPORATION, A CORPORATION OF NEW JERSEY.

REACTION PRODUCT OF CASHEW-SHELL OIL AND PROCESS.

No Drawing.　　Application filed August 6, 1926. Serial No. 127,709.

The present invention relates to reaction products of anacardic acid and cardol; for example, as they are found in the cellular shell of the cashew nut. The invention relates further to methods, processes, and steps for bringing about the reaction products of this invention. These reaction products are in the nature of liquids which can be dried and of semi-liquids and resin like materials which are suitable for impregnating fabrics and so on in which they are dried or solidified. These products are useful for making electrical insulating materials such as impregnated paper, cloth and so on and for applying directly to conductor bars, plates, or wires; for impregnating paper, fabrics and so on and for use in other ways for application in the arts generally.

The invention consists in forming the products having the general characteristics, the new and useful applications, and the several features of utility hereinafter set forth and claimed. The invention further consists in the new features of operation and the new and original arrangements and combinations of steps in the process hereinafter described and more particularly set forth and claimed.

In this specification and in the claims it is intended and it is to be understood that the term cashew shell oil means the juice or liquid naturally occurring in the cellular structure of the cashew nut, also juices or gums of a similar nature or composition which occur as sap, juice or gum of the cashew tree, and also from other sources natural or artificial. This cashew shell oil or juice comprises principally anacardic acid and cardol.

As has been pointed out in my copending application Serial Number 62,935, filed Oct. 16, 1925, cashew shell oil has the unusually high iodine number of about 290 and is characterized by that it will stand in air indefinitely, years, without drying or even forming any semblance of any scum on its exposed surface.

According to this invention this cashew shell oil is caused to have or acquire drying characteristics by reacting it with a metal. As far as is now known no appreciable amount of the metal enters into the reaction product. Also the nature of the reaction or reactions is not at present known. It is known, however, that the property of the oil can be changed from non-drying to drying by heating it and that oil which has been heated in contact with copper, or other metal, dries a great deal faster than oil heated alone, without contact with copper, or other metal. By contacting the oil with copper during heating, great saving is secured in the drying time of coatings and so on made thereby. When the treated oil dries a smooth, shiny film is formed.

In carrying out the invention cashew shell is reacted with a metal such as copper, nickel, Monel metal, lead, magnesium, calcium, or manganese. Copper is highly effective as a reaction agent for changing the characteristic and nature of cashew shell oil from non-drying to drying. The treated oil will dry more or less slowly in air and can be made to dry in various short intervals at raised temperatures according to the temperature and length of time of reaction and according to the temperature to which it is subjected for drying. That metals can be utilized for producing drying reactions on cashew shell oil has already been disclosed in my copending application Serial Number 114,554, filed June 8, 1926.

Copper is a preferred metal for producing the reaction and I have used experimentally the copper vessel of a dental vulcanizer at normal and at increased temperatures and for larger batches of material I have used a larger copper kettle, the copper of the vessel in which the cashew shell oil is heated and with which it, of course, came into contact serving to produce the reaction.

As an example of the process or method the following is cited. Raw cashew shell oil is placed in a copper kettle and heated at first at about 100° C. to drive off any moisture. The temperature is then raised to about 200° C. and the heating continued for from about one-half hour to about eight hours to get a reaction product of a desired consistency. When heated at this temperature for from one-half to four hours liquids are produced, films of which will dry in about 45 minutes at about 250° F. Cloth fabrics, paper, metal sheet, bars or wire dipped in these liquids will carry a film of the liquid which will dry and produce a uniform, smooth, and very flexible but hard and tough film. These liquids are soluble in most any solvent such as benzol, naphtha, kerosene, gasoline and so on in any quantities but the dried material is completely insoluble in these and even in acids and alkalis.

After about three and a half hours heating at this temperature the consistency begins to change and the liquid to thicken and liquid heated more than this length of time generally need a solvent or vehicle for the application thereof.

The cashew shell oil can be reacted with or without metal contact at various increased pressures ranging up to 100 lbs. at least to reduce the reaction time. For example, in a copper vessel at 50 to 60 lbs. pressure the oil was heated for one hour and a product was produced whose consistency was comparable to that made with four hours heating at normal temperature.

Other oils such as linseed, tung, and China wood oil, and resins such as coumerone can be used with the treated cashew shell oil to produce coating and impregnating material. For example, a mixture of linseed oil boiled to a jelly and dissolved in kerosene half in half is mixed equal parts with the cashew shell oil which has been heated with copper for four hours to make a dip for any of the uses herein noted. This mixture will dry at 250° F. in forty-five minutes. The proportion of cashew oil to linseed oil can be varied to suit desired needs. The best drying conditions are obtained with mixtures having from about 25% to 75% treated cashew shell oil.

In addition to the use of metals for producing the reactions of this invention there can also of course be used the metal compounds mentioned in my copending application Serial Number 114,554 filed June 8, 1926, of which this is a continuation in part and also other metal compounds such as oleates, stearates, and other organic compounds of copper and the other metals mentioned. These compounds are used in the reactions at normal and at increased pressures and the products applicable for like uses with or without the other oils or resins.

These liquids are suitable for preparing electrical insulation material such as for impregnating cloth fabrics or paper, for coating conductor bars, sheets, or wires; also for producing water proof cloth fabrics, cords, lines, papers, and so on; for making lining paper for food containers, bottle caps and the like.

The term "copper" in the claims is used to designate copper metal and is also intended to cover all the metalliferous reagents herein cited as useful in the practice of the present invention. Said term is used for this purpose to facilitate the description of the invention.

Although I have set forth and described one process for producing my new product, it is obvious that various changes may be made in the process or in the separate steps thereof without modifying or changing the essential features and characteristics of the products produced and that such products remain substantially with the same desirable characteristics although modifications may be made in the appearance, texture and in physical and chemical characteristics.

I claim:

1. The method of treating cashew shell oil which comprises heating it in a copper kettle to remove the non-drying characteristic of the oil.

2. The method of treating cashew shell oil to change it from a non-drying to a drying condition which comprises heating it in contact with copper.

3. The method of changing cashew shell oil from the natural non-drying condition to a drying condition which comprises heating it in a copper kettle.

4. The method of treating cashew shell oil which consists in heating it to drive off moisture and in heating it in a copper kettle at a temperature of about 200° C.

5. The method of treating cashew shell oil which consists in heating it in contact with copper at a temperature of about 200° C. for about one half hour to about eight hours to get a product of a desired consistency.

6. A liquid which will dry in about forty-five minutes at about 250° C. and which is obtained by heating together cashew shell oil and copper.

7. The method of treating cashew shell oil which comprises thickening it by heating it in contact with copper.

8. The method of treating cashew shell oil which comprises heating it at pressures greater than atmospheric in contact with copper.

9. The method of treating cashew shell oil which comprises heating it at pressures up to 100 lbs. for more than ten minutes in contact with copper.

10. The method of treating cashew shell oil to give it a drying characteristic which comprises heating it under pressures greater than normal with a metalliferous drying characteristic imparting agent.

11. A composition of matter obtained by heating cashew nut shell liquid in contact with copper.

12. A composition of matter useful in the arts of coatings, impregnations and molded articles and obtained by heating cashew nut shell liquid in contact with a metalliferous drying characteristic imparting agent.

13. A coating material obtained by heating cashew nut shell liquid in contact with copper.

14. A liquid which will dry and is obtained by heating cashew nut shell oil in contact with copper.

15. A liquid which will dry and is obtained by heating cashew nut shell oil in contact with a drying characteristic imparting agent which is a metal.

16. An article having adherent thereto a composition of matter obtained by heating cashew nut shell oil in contact with a metalliferous drying characteristic imparting agent.

17. An article coated with a product obtained by heating cashew nut shell oil in contact with copper.

Signed at Hoboken, in the county of Hudson and State of New Jersey, this 4th day of August, A. D. 1926.

MORTIMER T. HARVEY.